Nov. 24, 1953

F. E. SMITH 2,660,384

PUMP ASSEMBLY

Filed June 21, 1951

Inventor
Frederick E. Smith
by
Attys

Nov. 24, 1953 F. E. SMITH 2,660,384
PUMP ASSEMBLY
Filed June 21, 1951 2 Sheets-Sheet 2
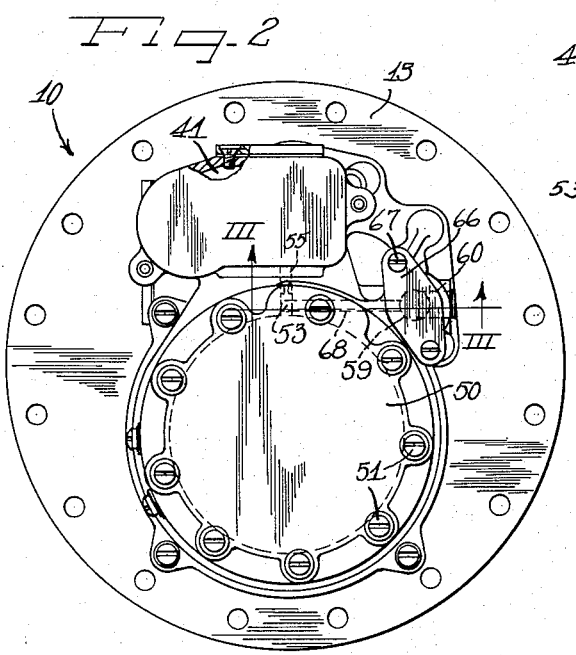
Inventor
Frederick E. Smith Patented Nov. 24, 1953

2,660,384

UNITED STATES PATENT OFFICE 2,660,384

PUMP ASSEMBLY

Frederick E. Smith, Cleveland Heights, Ohio, assignor to Thompson Products, Inc., Cleveland, Ohio, a corporation of Ohio Application June 21, 1951, Serial No. 232,753

13 Claims. (Cl. 244—135)

1

This invention relates generally to multiple pump constructions and more particularly to a double aircraft fuel booster pump adapted for submerged operation in an aircraft fuel cell and including pumps on both ends of an electric motor with vapor separating centrifugal impellers driven by the motor and each having a suction inlet at a different level in the fuel cell with the upper inlet controlled by a valve normally closed to unload the impeller associated therewith when the aircraft is operating under normal flight conditions and automatically opened in response to abnormalities in flight conditions to automatically expose the impeller to fuel.

Multiple unit pumps have been provided heretofore with separated inlets adapted to provide a supply of fuel for at least one of the pumping units during all conditions of flight, for example, during negative gravity flight conditions as well as during positive gravity flight. A particularly useful type of pumping apparatus employed in this connection has utilized a pair of pumping units driven by a common drive motor, each of the pumping units having a separate inlet at a different level of a fuel cell in which the pumping unit is customarily located.

When both of the separate inlets are open and submerged in fuel, a serious loading problem is presented because of the extra load placed on the common drive motor.

This problem has been successfully overcome according to the principles of the present invention by providing a valve in one of the pump inlets to isolate one of the impellers during conditions of normal flight when both of the inlets are likely to be concurrently submerged. Suitable actuating means are provided for the valve to open the valve whenever abnormalities in flight conditions arise and it is necessary to reload the isolated impeller for pumping.

More particularly, the present invention contemplates the provision of an inlet valve normally biased open by a control spring and actuated to a closed position by a pressure-sensitive diaphragm referenced to the discharge pressure of the pumping unit. A check valve referenced to a point of lower pressure, for example, the fuel cell, is connected in operative relationship with the pressure sensitive diaphragm. During normal flight conditions, the discharge pressure of the pump actuates the pressure-sensitive diaphragm, thereby rendering the control spring inoperative and closing the inlet valve. The check valve is sensitive to gravity and will open

2 under inverted or negative gravity flight conditions to relieve pressure on the diaphragm element and thereby permit the spring to open the valve and expose the pump inlet to the fuel for reloading the impeller.

It is an object of the present invention, therefore, to minimize loading of a multiple unit pump.

Another object of the present invention is to provide a multiple unit pump for an aircraft fuel system wherein one of the pumps will be substantially unloaded during conditions of normal flight.

Yet another object of the present invention is to provide a pumping unit for an aircraft fuel system having a plurality of pumps driven by a common motor wherein a separate inlet is provided for each pump, one of the inlets being selectively opened and closed in response to changes in flight conditions.

Many other features, advantages and additional objects of the present invention will become manifest to those versed in the art upon making reference to the detailed description which follows and the accompanying sheets of drawings in which a preferred structural embodiment of a pump assembly incorporating the principles of the present invention is shown by way of illustrative example.

On the drawings:

Figure 2 is an end elevational view of the pump assembly shown in Figure 1;

Figure 3 is a fragmentary cross sectional view taken substantially on line III—III of Figure 2; and Figure 4 is a fragmentary cross sectional view with parts shown in elevation showing the upper end of the pump assembly of Figure 1 in inverted position and with the inlet valve provided in accordance with the principles of the present invention open.

As shown on the drawings:

Figure 1:
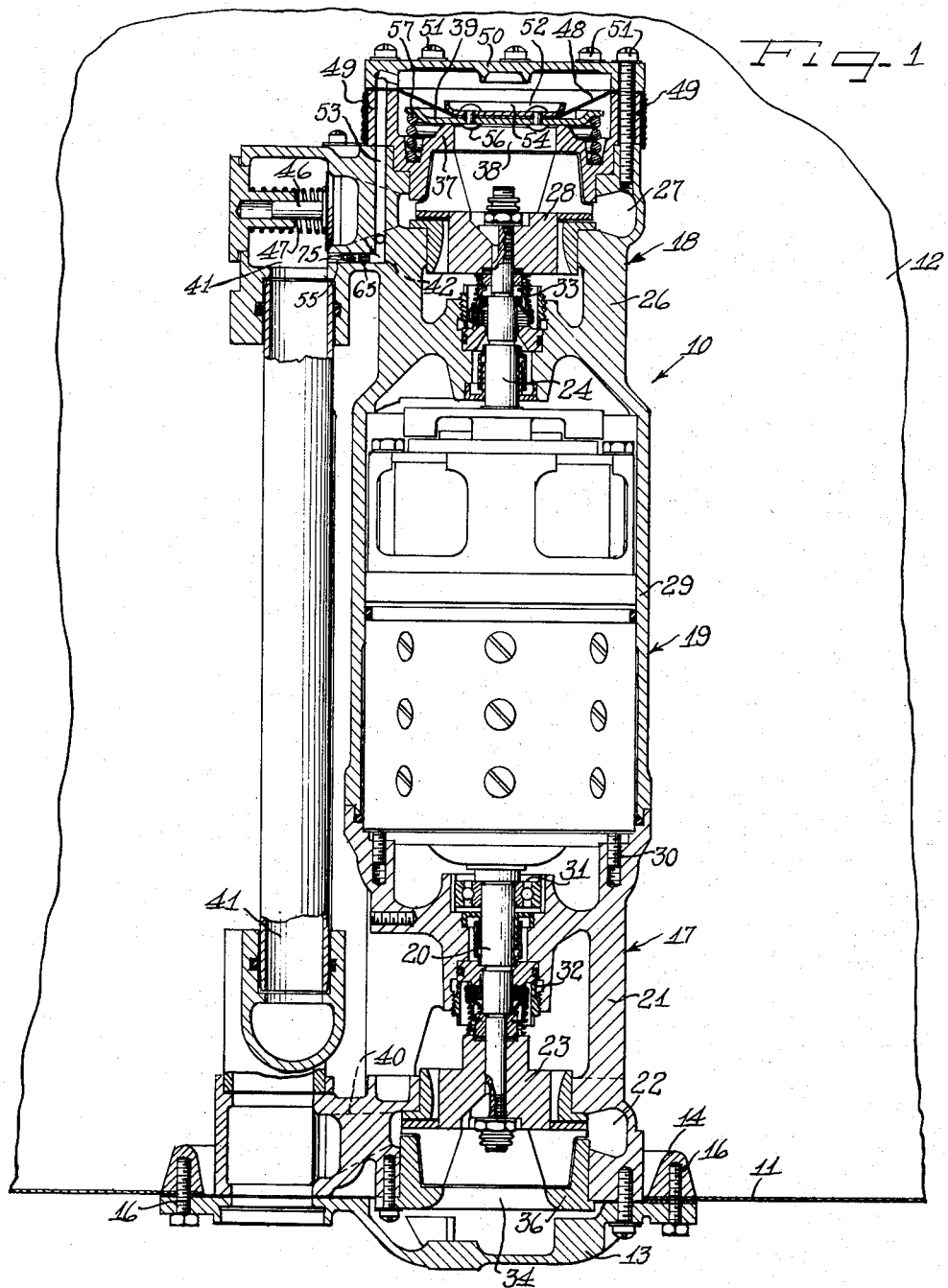
Figure 1 is a fragmentary cross sectional view with parts shown in elevation and with parts broken away showing a pump assembly provided in accordance with the principles of the present invention mounted in the fuel cell of an aircraft.

The pumping assembly of the present invention is indicated generally by the reference numeral 10 and is shown mounted to the bottom wall 11 of a fuel cell 12 conventionally provided to supply quantities of volatile fuel to the fuel system of an aircraft. A pump cover 13 is mounted on one side of the bottom wall 11, a retainer ring 14 abutting the other side of the bottom wall 11 and receiving a plurality of screws 16 serving to clamp the pumping assembly 10 in firm assembly with the fuel cell 12 so as to normally be aligned in a predetermined horizontal reference plane when the aircraft with which the fuel cell 12 is associated enjoys normal conditions of flight.

The pump assembly 10 comprises a first pump 17 and a second pump 18 each having rotary impellers driven by common drive motor 19. The components of the pump assembly 10 are arranged in coaxial vertically spaced alignment, the motor 19 having a first shaft 20 projecting into a housing 21 providing a volute chamber 22 in which a rotary impeller 23 connected to the shaft 20 is arranged to rotate and a second shaft 24 projecting into a housing 26 providing a volute chamber 27 in which a second rotary impeller 28 connected to the shaft 24 is arranged to rotate.

It may be noted that the housing 26 is provided with an extending portion 29 which engages the housing 21 thereby to encase the motor 19 which is held in assembly with the housing 21 by means of suitable fasteners 30.

The shaft 20 is journaled for rotation relative to the housing 21 by means of a bearing assembly indicated at 31 and a seal is established between the housing 21 and the shaft 20 by means of a sealing mechanism indicated at 32. In Figure 1 the sealing mechanism between the shaft 24 and the housing 26 is indicated at 33.

Each of the pumps 17 and 18 is provided with a separate inlet, the pump 17 being provided with an inlet 34 formed in an annular ring 36 arranged adjacent the end of the impeller 23.

The inlet of the pump 18 comprises an annular member forming a valve seat 37 surrounding an inlet passage 38 adapted to be controlled by a valve 39.

Because of the orientation of the pump assembly 10 in the fuel cell 12, it will be appreciated that the valve seat 37 is aligned in a normally horizontal plane when the pump assembly 10 is positioned uprightly during normal flight conditions and the valve 39 is arranged to move between an open and a closed position along an axis extending through the inlet passageway 38 and normal to the plane of the valve seat 37. Thus, when the pump assembly 10 is in upright position during normal flight, the weight of the valve 39 will tend to carry same into seating engagement with the valve seat 37 to close the inlet passageway 38.

By locating the inlet opening 34 and the inlet passageway 38 at opposite ends of the pump assembly, the respective inlets of the pumps 17 and 18 will take suction at different levels of the fuel cell 12 to insure submergence of at least one of the inlets under negative as well as positive gravity flight conditions.

Fuel entering the inlet opening 34 will be pressurized by the impeller 23 and discharged from the volute chamber 22 through a discharge opening 40 and into an outlet 41 which is common to both of the pumps 17 and 18.

Fuel entering the inlet passageway 38 is pressurized by the impeller 28 and is discharged from the volute chamber 27 through the outlet passageway 42 into the common outlet 41.

Under normal flight conditions, the inlets for both of the pumps 17 and 18 will normally be submerged thereby providing for a full flow of inlet fluid to each of the impellers 23 and 28.

In order to preclude the possibility of overloading the common drive motor 19 under such operating conditions, the present invention contemplates the isolation of the upper impeller 28 during normal flight conditions thereby affording a very substantial reduction in motor load. To assist in the isolation of the upper impeller 28, a check valve 46 biased by a coil spring 47 is provided to control the discharge opening 42 leading to the common outlet 41.

To insure seating of the valve 39 on the valve seat 37, a flexible diaphragm 48 is clamped between an annular peripherally apertured flange portion 49 concentrically arranged relative to the valve seat 37 and a cap member 50 which is retained in firm assembly with the housing 26 by means of plurality of cap screws 51. There is provided between the diaphragm 48 and the cap member 50, therefore, a control pressure chamber 52 which may be referenced to the discharge pressure of the fluid delivered to the common outlet 41 by means of a passage 53 and a second passage 55. A screen 43 is clamped around the flange portion 49 to prevent entering of foreign matter into the inlet passageway 38.

The diaphragm 48 is clamped in firm assembly with the valve 39 by means of a clamp retainer 54 fastened to the valve 39 by a plurality of rivets 56.

A control spring 57 taking the form of a resilient coil spring seated between the valve seat 37 and the flange portion 49 engages the valve 39 and exerts a control bias against the valve 39 in a direction away from the valve seat 37.

To selectively bleed off pressure from the pressure control chamber 52 to a point of lower pressure such as that existing in the fuel cell 12, a check valve is provided, the structural details of which are clearly shown in Figures 2 and 3. A housing boss 58 is provided with a bore 59 having an outlet passage 60 communicating with the fuel cell and an inlet passageway 61 controlled by a poppet 62 having a conical portion 63 arranged to open and close a seat portion 64 formed in the inlet passageway 61.

The bore 59 is closed by a cover 66 retained in assembly with the boss 58 by a pair of screws 67. The poppet 62 is of a shorter dimension than the length of the bore 59 and is freely reciprocable in the bore 59 so as to control the inlet passage 61 in response to changes in gravimetric force exerted thereupon.

A communicating passageway 68 extends through the boss 58 and intersects the passage 53, thereby to establish communication with the pressure control chamber 52.

During normal flight conditions when the pump assembly 10 is positioned uprightly, the poppet 62 engages the seat 64 to close the inlet passage 61 whereupon discharge pressure at the common outlet 41 will be transmitted through the passage 55, the passage 53 and into the pressure control chamber 52 to act against the diaphragm 48. The diaphragm 48 moving in response to the increased pressurization in the control chamber 52 will render the control spring 57 inoperative and will move the valve 39 into seating engagement with the valve seat 37, thereby to close off the inlet passageway 38. The impeller 28 of the pump 18 being isolated by closure of the inlet passageway 38, a very substantial reduction in motor load will occur during normal flight conditions even though the inlets of both of the pumps 17 and 18 are submerged.

During an abnormal flight condition, for example, if the aircraft is subjected to an inverted flight condition so that the pump assembly 10 is tilted away from its normal plane of reference, the poppet 62 will fall away from the seat 64 and the pressure in the pressure control chamber 52 will be reduced because the fluid transmitted thereto will be bled through the communicating passageway 68, through the inlet passageway 61, past the seat 64 and outwardly into the fuel cell 12 through the outlet passageway 60. As soon as the diaphragm 48 is unloaded, the control spring 57 again operates to urge the valve 39 away from the valve seat 37, thereby opening the inlet passageway 38 and automatically reloading the impeller 28. The position of the valve 39, the diaphragm 48 and the control spring 57 during an inverted flight position is clearly shown in Figure 4 wherein the control spring 57 has actuated the valve elements to a full open position.

It should be noted that the second passage 55 is provided with a restriction 65 so that pressure can be removed from chamber 52 almost instantly as soon as an abnormal flight condition occurs and the poppet 62 falls away from the seat 64. The inlet passage 61, of course, is provided to embody a sufficiently large capacity to exploit the advantageous provision of the restriction 65, whereby the valve 39 will open rapidly and will afford prompt reloading of the impeller 28 whenever required during the course of airflight.

A screen 75 is also provided in the second passage 55 to prevent clogging of the restriction 65 by foreign material.

Although various minor structural modifications might be suggested by those versed in the art, it should be clearly understood that I wish to embody within the scope of this patent all such modifications as reasonably and properly come within the scope of my contribution to the art.

I claim as my invention:

1. An aircraft fuel system, comprising, a fuel cell for volatile fuel, a pumping unit including a plurality of impellers and a common drive motor for said impellers, said pumping unit having a common outlet and a separate inlet for each of said impellers, said pumping unit arranged in said fuel cell with each of said inlets at a different level so that a lower inlet will be submerged under normal flight conditions, a valve in an upper inlet, a pressure loaded control means operably connected to said valve to selectively close said valve, passageway means between said outlet and said pressure loaded control means bleeding discharge pressure to said pressure loaded control means to close said valve and unload the impeller of the valved pumping unit, and additional control means engaging said pressure loaded control means to inactivate said pressure loaded control means in response to abnormal flight conditions whereby said valve may open to reload the impeller with fuel.

2. A fuel system for the prime mover of an aircraft, comprising, a fuel cell to contain volatile fuel, a pumping unit including a plurality of impellers and a common drive motor for said impellers, said pumping unit having a common outlet and a separate inlet for each of said impellers, said pumping unit arranged in said fuel cell with each of said inlets aligned on a different level so that a lower inlet will be submerged under normal flight conditions, an inlet valve in an upper inlet, a spring exerting an opening bias against said inlet valve, a pressure sensitive diaphragm connected to said valve, casing means providing a pressure control chamber behind said diaphragm to pressure load said diaphragm, a flow passage from the discharge of said pumping unit to said pressure control chamber, a relief passage from said pressure control chamber to the cell, and a gravity responsive check valve in said relief passage, the discharge of said pumping unit normally pressure loading said inlet valve closed to unload the impeller associated with said upper inlet, said gravity responsive check valve being displaceable in response to abnormalities in flight conditions, thereby to relieve the pressure on said valve, whereupon said spring will urge said inlet valve open.

3. A pumping unit adapted to be mounted in the fuel cell of an aircraft and including a plurality of impeller equipped pumps, a common drive motor for said impeller equipped pumps, each of said pumps having a separate inlet, said inlets being spaced apart from one another and adapted to be arranged at different levels in the cell, a common outlet for said pumps, a valve in one of said inlets and controlling the flow of inlet fluid through said one of said pump inlets, and actuating means engaging said valve and selectively closing said valve during normal flight conditions only to unload the pump associated with said one inlet whenever flight conditions are normal.

4. A pumping unit adapted to be mounted in the fuel cell of an aircraft and including a plurality of impeller equipped pumps, a common drive motor for said impeller equipped pumps, each of said pumps having a separate inlet, said inlets being spaced apart from one another and adapted to be arranged at different levels in the cell, a common outlet for said pumps, and a valve in one of said inlets, biasing means engaging said valve and tending to close said valve in said inlet for unloading one of the pumps, and actuating means engaging said valve and actuating said valve against said biasing means to an open position in response to abnormalities in flight conditions, wherein not all of said separate inlets are submerged, thereby to automatically reload said one of said pumps.

5. A pumping unit adapted to be submerged in the fuel cell of an aircraft and having at least two impellers and a common drive motor to rotate said impellers, said pumping unit having a common outlet for both of said impellers and a separate inlet for each impeller, a valve seat in one of said inlets, and a valve in said inlet closing said seat for unloading one of said impellers during normal flight, said valve seat aligned in a normally horizontal plane when said pumping unit is positioned uprightly, said valve arranged to move along an axis normal to the plane of said valve seat and vertically disposed when said pumping unit is positioned uprightly in normal level flight, gravity bias acting on said valve along said axis tending to move said valve to an open position when said pumping unit is inverted in abnormal flight to automatically reload said one impeller during abnormal flight.

6. A pumping unit normally aligned on a predetermined plane of reference comprising at least two pumps, each pump having a rotary impeller, a common drive motor to actuate said impellers, a common outlet for both of said pumps, a separate inlet for each of said pumps, one of said inlets having a valve seat, a valve in said inlet selectively closing said seat, and an actuating means engaging said valve to move said valve between an open and a closed position, said actuating means including position-sensitive means to move said valve into open position whenever said pumping unit is tilted away from said plane of reference.

7. A pumping unit normally aligned on a predetermined plane of reference comprising, at least two pumps, each pump having a rotary impeller, a common drive motor to actuate said impellers, a common outlet for both of said pumps, a separate inlet for each of said pumps, one of said inlets having a valve seat, an inlet valve selectively closing said seat, control means exerting an opening bias against said inlet valve, a pressure loaded means engaging said inlet valve and selectively rendering said control means inoperative for closing said valve, flow passage means from said outlet to said pressure loaded means and communicating pump discharge pressure to said pressure loaded means, and a relief valve connected to said pressure loaded means and to selectively render said pressure loaded means inoperative whereupon said control means will open said inlet valve, said relief valve incorporating a position sensing operating element whereupon said inlet valve will be opened to load the impeller associated therewith only when said pumping unit is tilted out of said plane of reference.

8. An aircraft fuel system comprising a pumping unit having a plurality of pumps, a common driving motor for said pumps, a separate inlet for each pump in spaced apart relation to one another to take suction at different relative levels, a valve in one of said inlets, means normally closing said valve in said one of said inlets whenever said pumping unit is positioned uprightly during normal flight conditions and means opening said valve in said one of said inlets whenever said pumping unit is tilted towards inverted position during abnormal flight conditions.

9. An aircraft fuel system, comprising, a pumping unit having a plurality of pumps, a common driving motor for said pumps, a separate inlet for each pump in spaced apart relation to one another to take suction at different relative levels, a poppet valve bias towards open position and being in one of said inlets, means retaining said valve in closed position in said one of said inlets whenever said pumping unit is positioned uprightly during normal flight conditions, and position sensitive means rendering said last mentioned means inoperative whenever said pumping unit is tilted towards inverted position during abnormal flight conditions to open said poppet valve.

10. A pump unit comprising an electric motor, a centrifugal pump casing on each end of the motor, an impeller in each casing coupled to the motor, said casings having separate central suction inlets and separate peripheral outlets, a conduit connecting said outlets, means for mounting the unit in an upright position to place the inlets at different levels, a pressure sensitive valve closing the inlet of the top pump casing, means exerting a bias against said pressure sensitive valve in a valve opening direction, means defining a passage connected to said conduit and said valve and bleeding pump discharge pressure to the pressure sensitive valve for closing the pressure sensitive valve in normal flight when the discharge pressure exerts a pressure force exceeding the biasing force, and a gravity sensitive vent in the bleeder passage means selectively relieving pressure in said passage to a value less than said biasing force whereupon the biasing means open the pressure sensitive valve only when the unit is inverted or subjected to negative gravity conditions as in abnormal flight.

11. A pump unit comprising a motor, a centrifugal pump casing on each end of the motor, an impeller in each casing coupled to the motor, said casing having separate suction inlets arranged at different levels and separate outlets, a discharge conduit connecting both of said outlets, means for maintaining the pump unit in an upright position with the pump casings in vertically spaced alignment, an inlet valve in the inlet of the upper pump, a pressure control chamber in the upper casing behind said inlet valve and operably associated therewith to impart pressure forces thereto, a passageway between the pressure control chamber and said discharge conduit, said inlet valve being closed by said pressure forces upon a build-up of pressure in said control chamber, a gravity responsive check valve in the upper casing to reference said control chamber to a point at lower pressure, said gravity responsive check valve operative to reduce the pressure in said control chamber whenever said pump unit is tilted out of an upright position and control biasing means tending to bias said inlet valve open, whereby said upper inlet will be normally closed whenever said pump unit is positioned uprightly and will be opened whenever said pump unit is tilted away from upright position.

12. A pumping unit comprising a motor, a centrifugal pump on each end of said motor, each pump having separate suction inlets spaced apart from one another, said pumps having a common discharge outlet, means mounting said pumping unit in normally upright position with said separate suction inlets arranged in vertically spaced alignment, an inlet valve in the inlet of the uppermost pump, means forming a pressure control chamber behind said inlet valve and in operable relation thereto to exert pressure forces thereon, means forming a passageway from said pressure control chamber to said common discharge outlet, a restriction in said passageway to control the flow of discharged fluid therethrough and a gravity responsive check valve referencing said control chamber to a point at lower pressure, said inlet valve normally urged closed by discharge pressure forces developed in said control chamber whenever said pumping unit is positioned uprightly, said inlet valve arranged to open when said pumping unit is tilted away from upright position and said gravity responsive check valve is actuated to reduce the pressure in said control chamber.

13. A pumping unit comprising a motor, a centrifugal pump on each end of said motor, each pump having separate suction inlets spaced apart from one another, said pumps having a common discharge outlet, means mounting said pumping unit in normally upright position with said separate suction inlets arranged in vertically spaced alignment, an inlet valve in the inlet of the uppermost pump, means forming a pressure control chamber behind said inlet valve and in operable relation therewith to impart pressure forces thereto, means forming a passageway from said pressure control chamber to said common discharge outlet, a restriction in said passageway to control the flow of discharged fluid therethrough and a gravity responsive check valve referencing said control chamber to a point at lower pressure, said inlet valve normally urged closed by discharge pressure forces developed in said control chamber whenever said pumping unit is positioned uprightly, said inlet valve arranged to open when said pumping unit is tilted away from upright position and said gravity responsive check valve is actuated to reduce the pressure in said control chamber, said inlet valve further including a control biasing means normally urging said inlet valve open to assist in opening said inlet valve whenever the pressure in said control chamber is reduced below a predetermined value.

FREDERICK E. SMITH.

References Cited in the file of this patent

UNITED STATES PATENTS

| Number | Name | Date |
|---|---|---|
| 1,933,753 | Parsons | Nov. 7, 1933 |
| 2,016,278 | Ehlers | Oct. 8, 1935 |
| 2,546,034 | Lansing | Mar. 20, 1951 |
| 2,547,246 | Aspelin | Apr. 3, 1951 |